US010401951B2

United States Patent
Quennesson

(10) Patent No.: US 10,401,951 B2
(45) Date of Patent: *Sep. 3, 2019

(54) MOTION TRACKING USER INTERFACE

(71) Applicant: Apple Inc., Cupertino, CA (US)

(72) Inventor: Kevin H. Quennesson, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,674

(22) Filed: Jul. 3, 2018

(65) Prior Publication Data

US 2019/0041981 A1 Feb. 7, 2019

Related U.S. Application Data

(63) Continuation of application No. 15/656,433, filed on Jul. 21, 2017, now Pat. No. 10,019,056, which is a (Continued)

(51) Int. Cl.
*G06T 19/00* (2011.01)
*G06F 3/01* (2006.01)
(Continued)

(52) U.S. Cl.
CPC .............. *G06F 3/012* (2013.01); *G06F 3/005* (2013.01); *G06F 3/017* (2013.01); *G06F 3/0304* (2013.01);
(Continued)

(58) Field of Classification Search
CPC ... H04N 13/0468; G06T 19/00; G06F 3/0346; G06F 3/012; G06F 3/0304
See application file for complete search history.

(56) References Cited

U.S. PATENT DOCUMENTS 5,264,836 A 11/1993 Rubin
5,305,764 A 4/1994 Yamada et al.
(Continued)

OTHER PUBLICATIONS

U.S. Final Office Action for U.S. Appl. No. 11/956,275 dated Jun. 22, 2011, 10 pages.
U.S. Notice of Allowance for U.S. Appl. No. 11/956,275 dated Dec. 14, 2011, 5 pages.
U.S. Non-Final Office Action for U.S. Appl. No. 11/956,275 dated Dec. 23, 2010, 10 pages.

*Primary Examiner* — Abbas I Abdulselam
(74) *Attorney, Agent, or Firm* — Van Court & Aldridge LLP

(57) ABSTRACT

A method to transition focus of a display corresponding to an object's motion tracked by a video camera or like device is disclosed. In one implementation, the display shows one or more windows or user interfaces on the display. The object's motion can be used to select one of the windows or user interfaces on the display and manipulate content presented in the window or user interface. In another implementations, the object's motion can manipulate a three-dimensional graphical icon in a three-dimensional display environment, for example, by rotating it. In another implementation, the method further tracks motion of a second object and shifts focus of the display corresponding to the motion of the second object. In another implementation, a second display may be added to mirror the focus transition corresponding to the object's motion.

17 Claims, 13 Drawing Sheets

Related U.S. Application Data continuation of application No. 14/730,628, filed on Jun. 4, 2015, now Pat. No. 9,715,273, which is a continuation of application No. 13/447,443, filed on Apr. 16, 2012, now Pat. No. 9,052,743, which is a continuation of application No. 11/956,275, filed on Dec. 13, 2007, now Pat. No. 8,159,458.

(51) Int. Cl.
*H04N 13/366* (2018.01)
*G06F 3/03* (2006.01)
*G06F 3/0346* (2013.01)
*G06F 3/00* (2006.01)
*G06F 3/0481* (2013.01)
*G06T 7/269* (2017.01)
*G09G 5/14* (2006.01)

(52) U.S. Cl.
CPC ........ *G06F 3/0346* (2013.01); *G06F 3/04815* (2013.01); *G06F 3/04817* (2013.01); *G06T 7/269* (2017.01); *G06T 19/00* (2013.01); *H04N 13/366* (2018.05); *G06T 2207/10016* (2013.01); *G06T 2207/30201* (2013.01); *G06T 2219/028* (2013.01); *G09G 5/14* (2013.01)

(56) References Cited

U.S. PATENT DOCUMENTS

| | | |
|---|---|---|
| 6,100,878 A | 8/2000 | Hirayama |
| 6,544,123 B1 | 4/2003 | Tanaka et al. |
| 6,847,336 B1 | 1/2005 | Lemelson et al. |
| 7,194,703 B2 | 3/2007 | Yokomizo |
| 7,629,967 B2 | 12/2009 | Newton |
| 7,810,046 B2 | 10/2010 | Hiraoka et al. |
| 7,834,849 B2 | 11/2010 | Hunleth et al. |
| 7,898,563 B2 | 3/2011 | Park |
| 7,974,494 B2 | 7/2011 | Kawamura et al. |
| 8,094,120 B2 * | 1/2012 | Ratai ................. G02B 27/0093 345/156 |
| 8,094,204 B2 | 1/2012 | Tsurumi |
| 8,203,599 B2 * | 6/2012 | Kim ................... H04N 13/0033 348/51 |
| 10,019,056 B2 * | 7/2018 | Quennesson ........... G06F 3/012 |
| 2008/0122798 A1 | 5/2008 | Koshiyama et al. |
| 2010/0019992 A1 * | 1/2010 | Maguire, Jr. ........... G06F 3/011 345/8 |

\* cited by examiner

800 —
Visually Track an Object's Motion from a
First Position to a Second Position 810 —
Transition Focus of a Display from a First
Visual Presentation to a Second Visual
Presentation Corresponding to the Object's Motion

FIG. 8

900 —
Indicate a Current Focus of a Display by a
Graphical Icon

910 —
Visually Track an Object's Motion from a First
Visual State to a Second Visual State 920 —
Transition the Graphical Icon on the Display from a
First Visual Presentation to a Second Visual
Presentation Corresponding to the Object's Motion

FIG. 9

1000
Visually Track an Object's Motion from a First Position to a Second Position 1010
Transition Focus of a Display from a First Visual Presentation to a Second Visual Presentation Corresponding to the Object's Motion 1020
Visually Track a Second Object's Motion from a Third Position to a Fourth Position 1030
Transition Focus of the Display from a Third Visual Presentation to a Fourth Visual Presentation Corresponding to the Second Object's Motion

FIG. 10

1100
Visually Track an Object's Motion from a First Position to a Second Position 1110
Transition Focus of a Display from a First Visual Presentation to a Second Visual Presentation Corresponding to the Object's Motion 1120
Display the Focus Transition on a Second Display

MOTION TRACKING USER INTERFACE

CROSS-REFERENCE TO RELATED APPLICATION

This application is a continuation of U.S. application Ser. No. 15/656,433, filed Jul. 21, 2017 (now U.S. Pat. No. 10,019,056), which is a continuation of U.S. application Ser. No. 14/730,628, filed Jun. 4, 2015 (now U.S. Pat. No. 9,715,273), which is a continuation of U.S. application Ser. No. 13/447,443, filed Apr. 16, 2012 (now U.S. Pat. No. 9,052,743), which is a continuation of U.S. application Ser. No. 11/956,275, filed Dec. 13, 2007 (now U.S. Pat. No. 8,159,458). The content of each earlier application is incorporated by reference.

TECHNICAL FIELD

The subject matter of this patent application generally relates to user interfaces.

BACKGROUND

Input devices for computer systems commonly include a mouse, a keyboard, or other input devices (e.g., a pen-based device, a track ball, etc). Each of these input devices requires a user's spare hand to operate. In some cases, a user may need both hands free to complete a task (e.g., typing on a keyboard) or the user may suffer from a disability that precludes the use of one hand. When the user desires to interact with the computer system, the user must interrupt the task to manipulate an input device.

SUMMARY

A method to transition focus of a display corresponding to an object's motion tracked by a video camera or like device is disclosed. In one implementation, the display shows one or more windows or user interfaces on the display. The object's motion can be used to select one of the windows or user interfaces on the display and manipulate content presented in the window or user interface. In another implementations, the object's motion can manipulate a three-dimensional graphical icon in a three-dimensional display environment, for example, by rotating it. In another implementation, the method further tracks a second object's motion in the display and shifts focus of the display corresponding to the motion of the second object. In another implementation, a second display may be added to mirror the focus transition corresponding to the object's motion.

Particular embodiments of the subject matter described in this specification can be implemented to realize one or more of the following advantages. A user can free the use of both hands while navigating a user interface or interacting with an application on a computer system.

DESCRIPTION OF DRAWINGS

FIG. 8 is a flow diagram of an example process for transitioning focus of a display corresponding to an object's motion.

FIG. 9 is a flow diagram of an example process for transitioning a graphical icon's visual presentation corresponding to an object's motion.

FIG. 10 is a flow diagram of an example process for tracking two objects' motions and transitioning focus of display corresponding to the two objects' motions.

FIG. 11 is a flow diagram of an example process for tracking an object's motion and transitioning focus of a second display corresponding to the object's motion.

DETAILED DESCRIPTION

Selection of a Target-Zone

Figure 1:
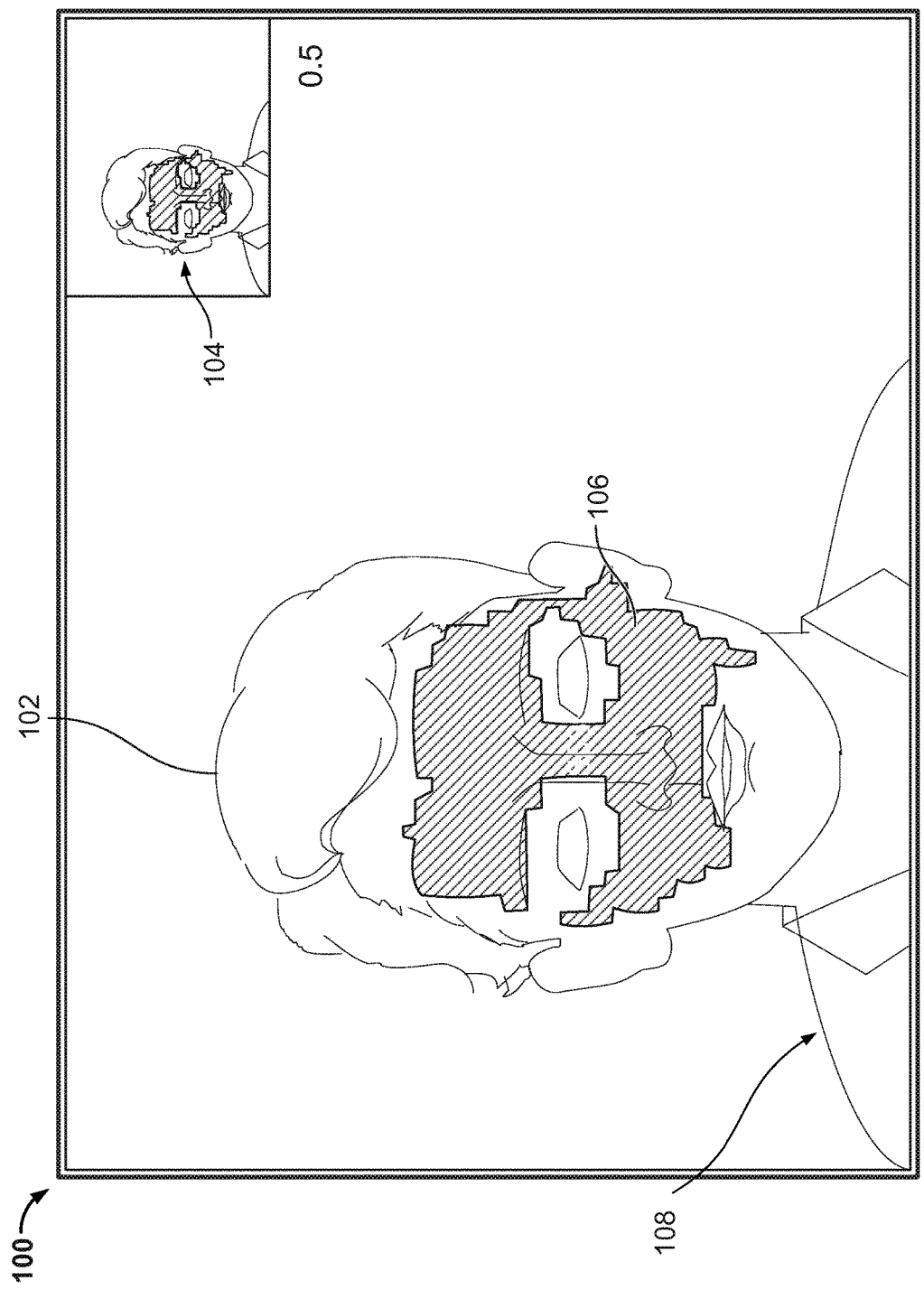
FIG. 1 is a screenshot showing a visual tracking of an object, namely, a user's head by a camera or a like device.

FIG. 1 is a screenshot showing a visual tracking of an object, namely, a head 102 of a user 108 by a video camera or a like device. In the example shown, a user 108 is in front of the video camera or the like device (e.g., Apple Inc.'s iSight® camera). An image 104 of the user's head 102 is captured by the video camera or the like device and displayed on the top right corner of a display 100 (e.g., a computer monitor). The image 104 conveys a message to the user 108 about which region of his head 102 is to be tracked by the video camera.

In some implementations, the user 108 can select a target zone to be traced by clicking on a zone of the image 104. In the example shown, the user 108 has selected the target zone 106 to be his head 102. The video camera puts the target zone 106 in focus and tracks the motion of the target zone 106 relative to the video camera.

In some implementations, the object to be tracked is not necessarily a human head. Any tangible objects can be tracked, such as a pen, a box, a hand, etc.

Figure 2:
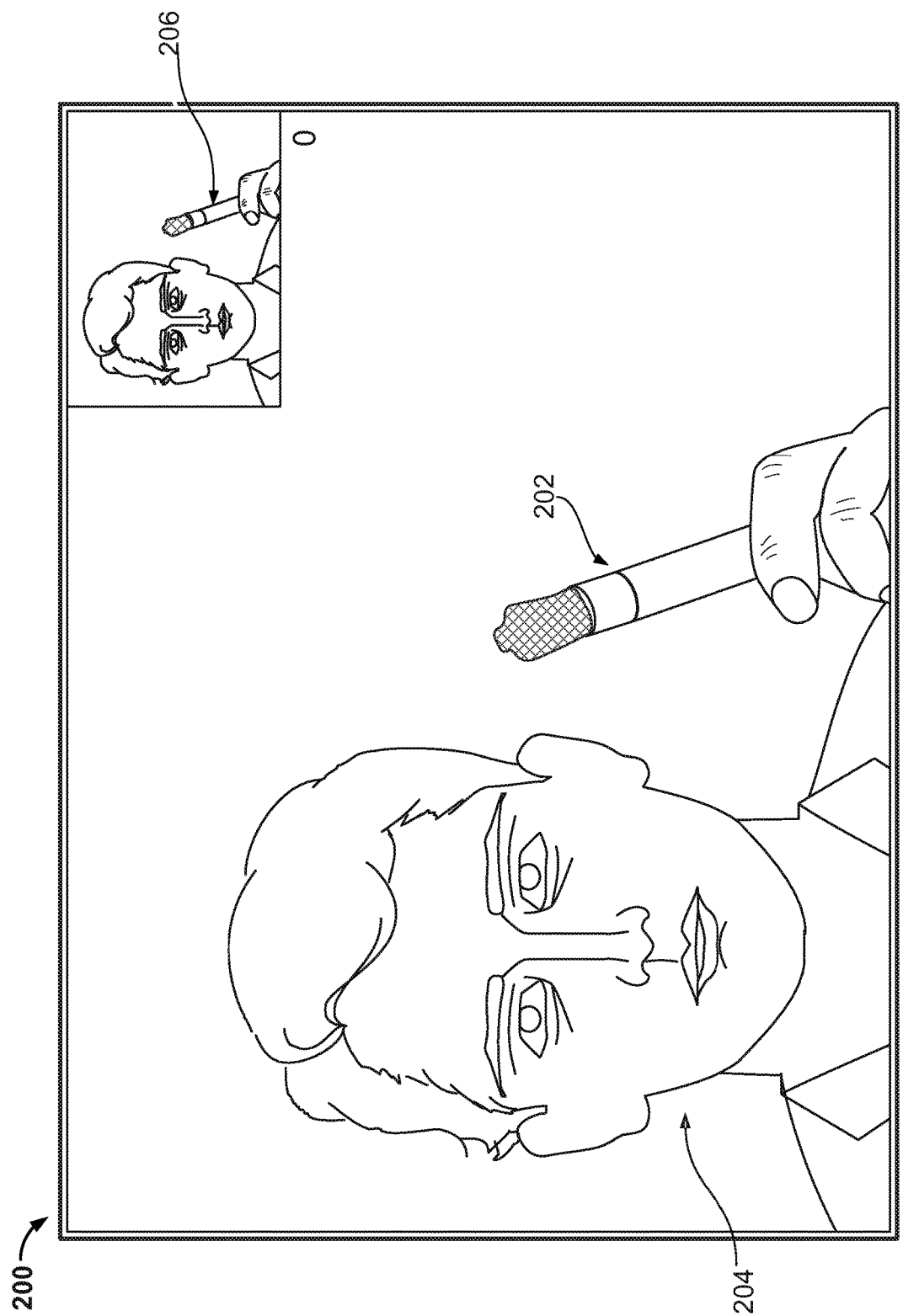
FIG. 2 is a screenshot showing visual tracking of an object, a pen, which is manipulated by a user.

FIG. 2 is a screenshot showing the visual tracking of a pen 202 by the video camera. A user 204 is holding the pen 202 in front of a video camera. An image 206 of the pen 202 captured by the video camera is displayed on the top right corner of the screen 200, for example. Similar to FIG. 1, the image 206 conveys a message to the user 204 about which region of the pen 202 is to be tracked by the video camera.

As can be seen in the image 206, the region targeted is the top of the pen 202. The video camera will accordingly track the top of the pen 202.

In some implementations, selecting a target zone to be tracked by physical clicking is not necessary. For example, optical flow information can be used to automatically detect a moving object without additional effort by a user to select a target zone to be tracked.

Optical flow is a known technology often used in the motion picture industry. For each pixel in a frame, a motion vector is calculated which describes a sub pixel x and y movement. A measure of how good a motion vector is, or how different a next frame is, can also be computed. For example, an absolute difference can be computed between a pixel in a first frame shifted by its motion vector and a corresponding pixel in a second frame. There can also be a confidence level or a penalty computed for describing how different the pixel is from neighboring vectors. Optical flow can be performed in floating point and often can be stored in OpenEXR file formats.

Target Tracking

Figure 3:
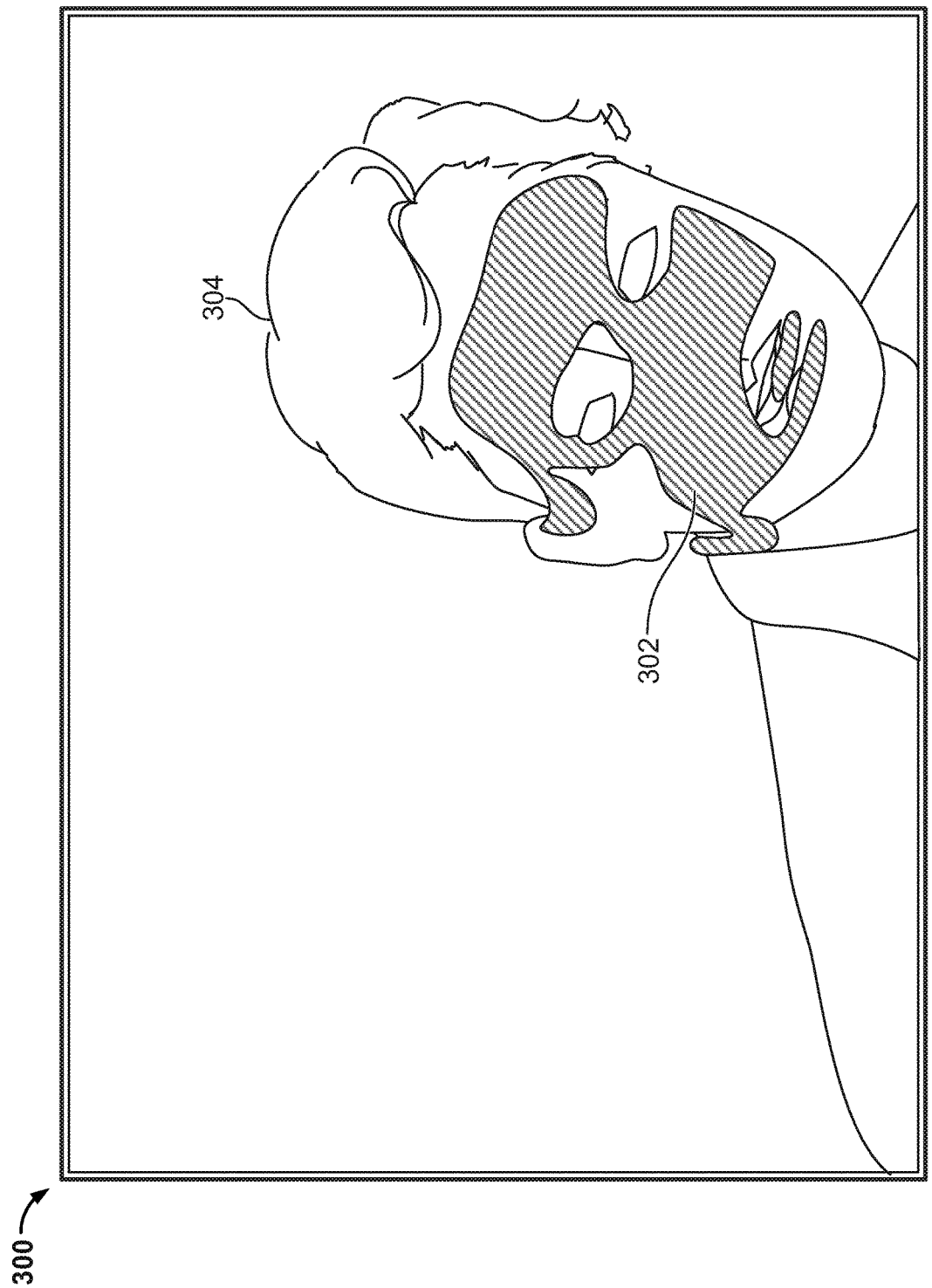
FIG. 3 is a screenshot showing a visual tracking of a target zone of a user's head moving from one position to another position.

FIG. 3 is a screenshot showing tracking of a target zone 302 of a head 304 of a user moving from one position to another position. In FIG. 3, the target zone 302 of the user is moving his head 304 from a left position to a right position. At the same time, the video camera is tracking and, optionally, recording the motion of the target zone 302, such that the tracking information can be used for any of a number of purposes (e.g., transitioning focus of a display 300 corresponding to the motion of the target zone 302).

Focus Transition of a Display

Figure 4:
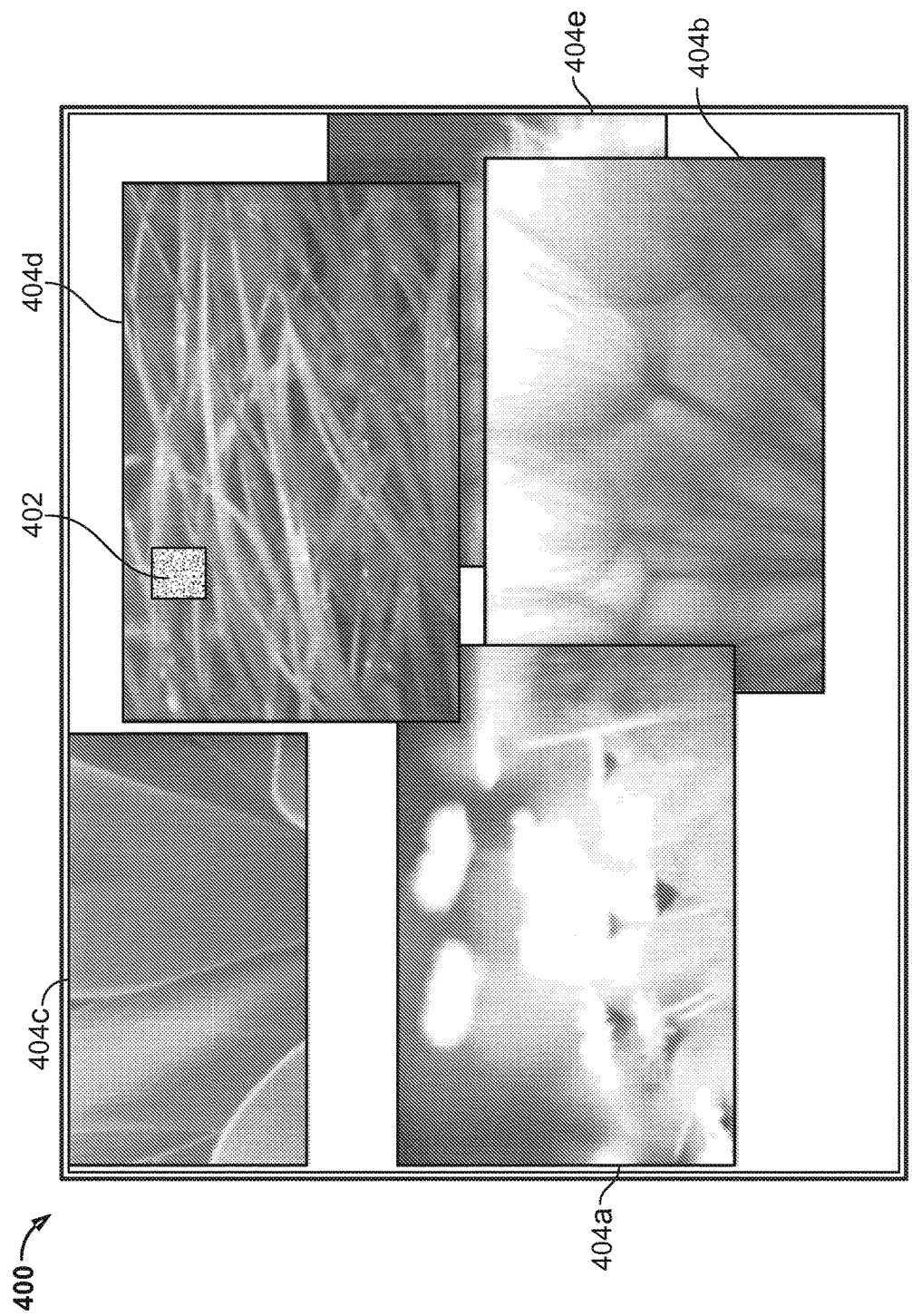
FIG. 4 is a screenshot showing a pointer indicating focus transitioning of a display among multiple windows concurrently shown on the display.

FIG. 4 is a screenshot showing using a pointer 402 to indicate focus transitioning of a display 400 among multiple windows 404a-404e. In the example shown, windows 404a, 404b, 404c, 404d, and 404e are concurrently shown on the display 400, and each window is displaying content (e.g., a digital image).

The pointer 402 is used to indicate the current focus of the display (e.g., the window currently active). More specifically, the pointer 402 is used to indicate the transition of focus of the display 400 in correspondence with the motion of the human head or other object. For example, when the human head moves from left to right, the pointer 402 shown on the display 400 originally pausing at the window 404a, shifts from the window 404a to 404d in response to the motion, to indicate that the focus of the display (e.g., the currently active window) has been transitioned from the window 404a to 404d. Similarly, if the human head or other object move from right to left, the pointer 402 shifts from 404d to 404c. This way the human head being tracked is capable of arbitrarily changing the focus of the display 400 from a first window to a second window, as well as changing the position of the pointer on the display 400.

FIG. 4 illustrates an example of transitioning focus among five windows 404a, 404b, 404c, 404d, and 404e, which might or might not overlap with each other on the display 400. The method disclosed in this application can detect the movement of the human head or other objects, and in turn place the pointer on the window intended by the user to be focused on. For example, starting from a point in the window 404d, if the human head moves from upper left to lower right, the pointer will move correspondingly from upper left to lower right and then bring the window 404e to focus. When the window 404e is in focus, the window 404e will be automatically raised to the top of all the windows such that the user can clearly see the current focus of the display.

In some implementations, after the user selects one of the multiple windows shown on the display, the user can start to hover the pointer within the selected window by slowly moving his head over relatively short distances. For example, say the pointer 402 is now placed at the window 404a and the user would like to hover the pointer within the window 404a. He could just slowly move his head over short distances, and the pointer will hover within the window 404a corresponding to his head motion. Other patterns of motion can be used to signal a hover. For example the motion can be described in terms of a path. The path can define a pattern, which can be mapped to an appropriate action.

In some implementations, there might be only one window shown on the display at one time. Similar to controlling the pointer to hover within one of the multiple windows, the user can move his head to shift focus within the single window.

In some implementations, the one or more windows (or applications user interfaces) shown on a display include an editor or a browser. A user can scroll a digital file presented by the editor or the browser in different directions such as up, down, left, and right simply by moving his head or the other object. For example, say there is a five-page file presented by a word processor on a display, and only the first page is shown within the workspace of the word processor. If the user would like to see the last page of the file, he could simply move his head down to scroll the digital file down to the last page. Optionally, he could flip the digital file page-by-page by slightly moving his head down over a relatively short distance.

In some implementations, the one or more windows (or application user interfaces) shown on the display present digital images or include three-dimensional effects (e.g., three-dimensional icons). In some implementations, the pointer indicating focus of the display can be a cursor. In certain computer operating systems, it is advantageous to use multiple types of cursors.

Manipulation of a Graphical Icon

Figure 5:
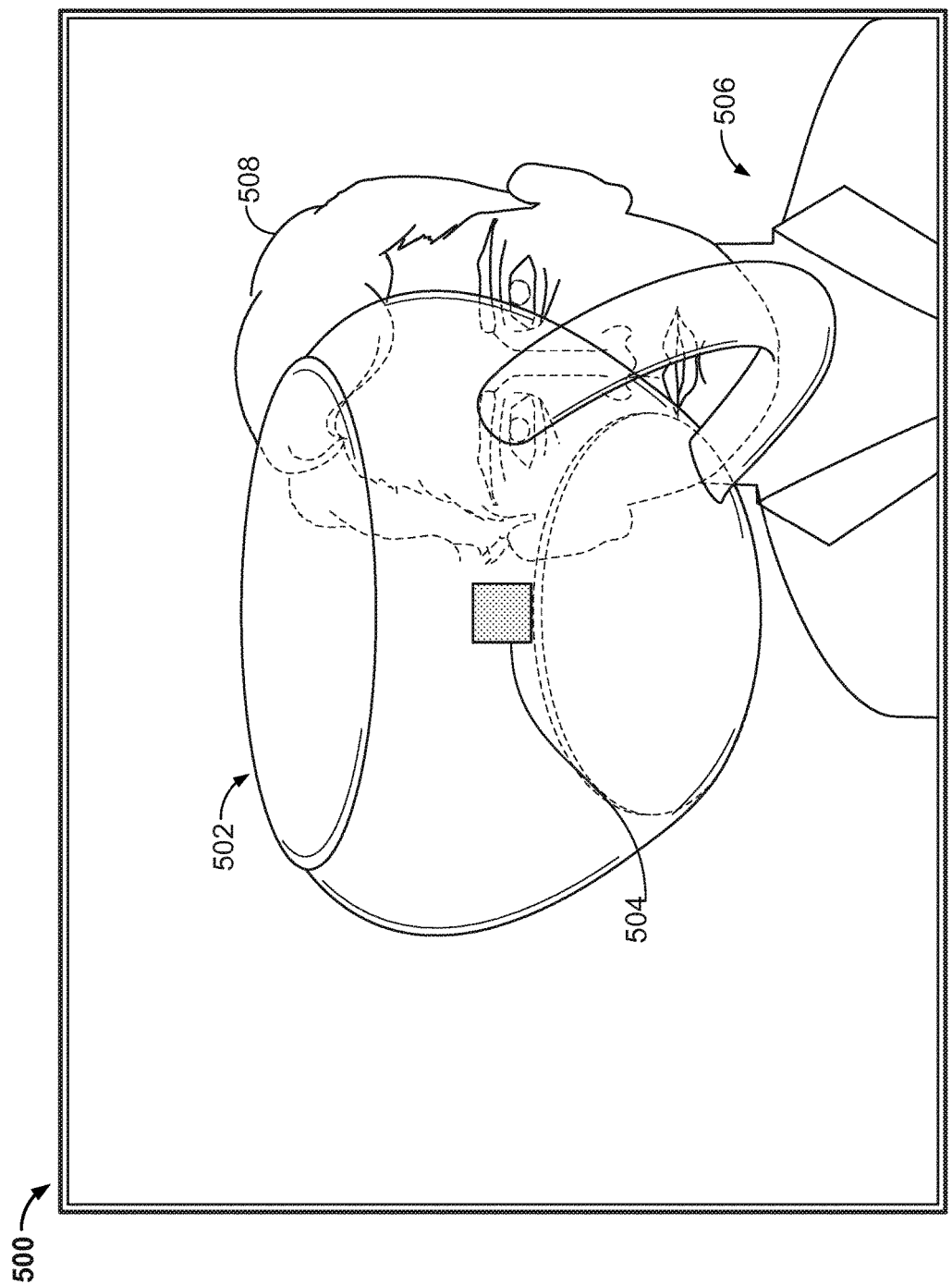
FIG. 5 is a screenshot showing a three-dimensional graphical icon, namely, a teapot, which is being manipulated by a user using his head motion.

FIG. 5 is a screenshot showing a three-dimensional graphical icon 502 (e.g., a teapot), being manipulated by a user 506 moving his head 508. The pointer 504 indicates the current focus of the display 500. The icon 502 as well as the pointer 504 are controlled by the head motion of the user 506. As described earlier, when the user 506 moves his head 508 in a direction, the pointer 504 will move on the display in response to the head motion. Likewise, the graphical icon 502 will move along with the pointer 504 in response to the head motion.

In some implementations, the user 506 can manipulate the icon 502 linearly (e.g., follow a straight motion path on the display 400) and/or non-linearly (e.g., follow a curved motion path on the display 400). For example, the user 506 can turn his head 508 to the right to make the teapot 502 turn to the right, or turn his head to the left to make the teapot 502 turn to the left. Thus, in a three-dimensional display environment, the head or object motion being tracked by the video camera or like device, can cause a graphical object to move in six degrees of freedom, including up, down, left, right, backward, forward, rotations, etc.

In some implementations, the graphical icon 502 can serve as an avatar representing a user. A user could control eye positions of an avatar through head motions. For example, when the user looks right, his head motion will trigger the avatar to look right. When the user looks left, his head motion will trigger the avatar look left. In other implementations, the avatar could simulate movements that the user makes, other than rotating or linear moving.

The avatar representation can be broadly applied in computer technology, whether in the form of a three-dimensional model used in computer games, a two-dimensional icon (picture) used on Internet forums or chatting websites.

Manipulation of the Graphical Icon and Focus Transition of the Display

Figure 6:
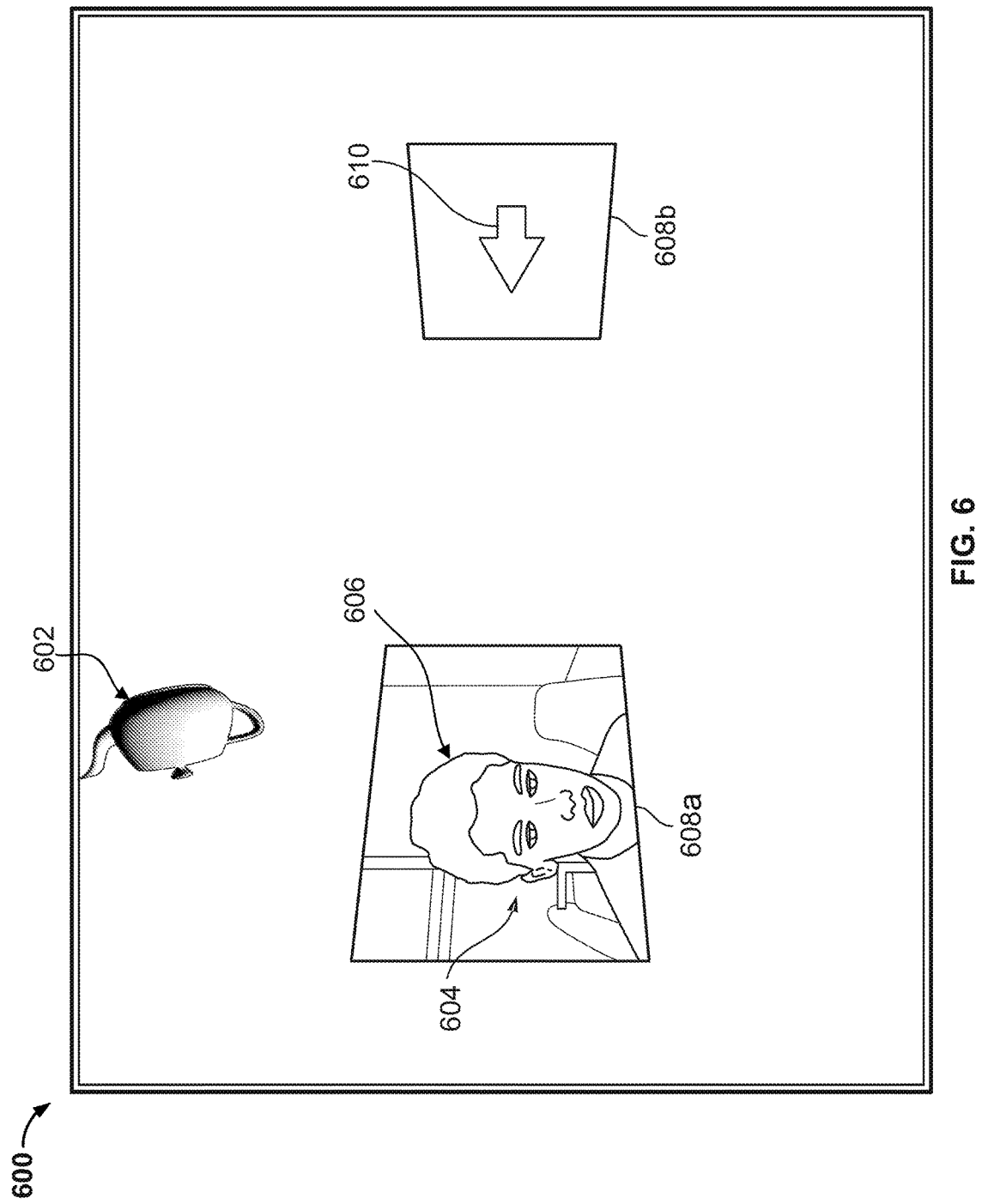
FIG. 6 is a screenshot showing the icon being moved and manipulated at the same time by a user using his head motion.

FIG. 6 is a screenshot showing a graphical icon 602 (e.g., a teapot), being moved and manipulated at the same time by the user 604 moving his head 606. In the example shown, two windows 608a and 608b are concurrently shown on a display 600. The icon 602 indicates the current focus of the display 600 and follows the user's head motion. The arrow 610 in the window 608b shows the moving direction of the teapot 602.

As shown in FIG. 6, the user 604 is moving the teapot 602 by moving his head in a linear path from right to left. At the same time, the user 604 is arbitrarily manipulating the teapot, like rotating it counterclockwise. This way the user 604 can switch the current focus of the display 600 between the two windows 608a and 608b, as well as manipulate the teapot 602 at the same time. In some implementations, there are more than two windows concurrently shown on the display 600.

Extraction of Optical Flow Information

Figure 7:
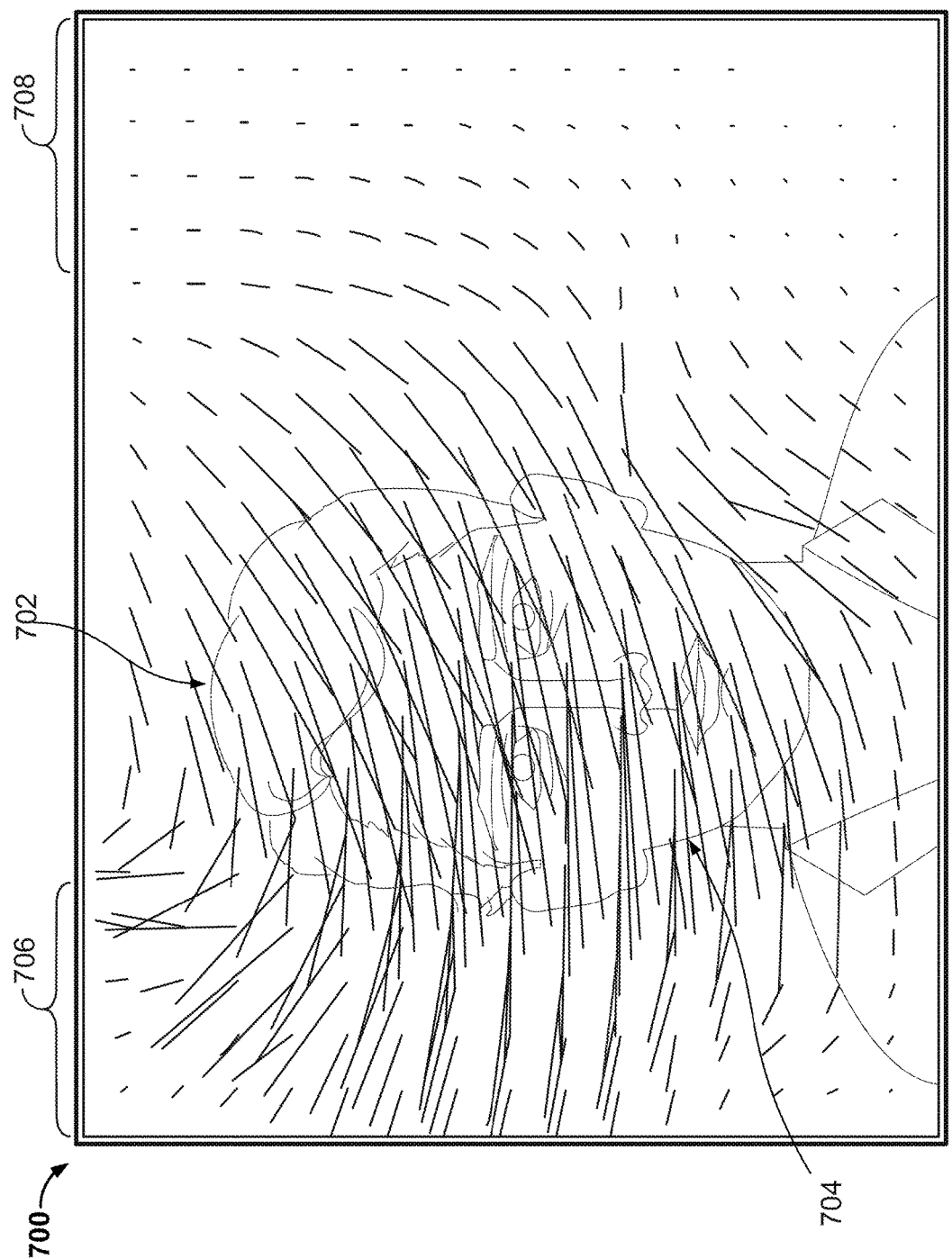
FIG. 7 is a screenshot showing optical flow of a user motion turning his head from left to right.

FIG. 7 is a screenshot showing optical flow of the user 702 when turning his head 704 from left to right. Optical flow as used in this application is a visual representation approximating a motion of an object and would likely not be visible to the user in an actual application. As can be seen in FIG. 7, lines 706 (e.g., motion vectors) on the left side of the display 700 represent optical flow from left to right simulating the motion of the user 702 turning his head from left to right. In contrast, dots 708 on the right side of the display 700 appear relatively still because there is no object moving in the corresponding area (e.g., the motion vector has zero components).

In some implementations, it can be advantageous to extract optical flow information of an object motion from a background. The optical flow provides information on direction, intensity, and number of moving parts which can be captured in real-time by the video camera. Subsequently, the optical flow information can be used for transitioning the current focus of a display corresponding to the object motion.

Example Process of Display for Visual Motion-Tracking

FIG. 8 is a flow diagram of an example of transitioning a current focus of a display corresponding to an object's motion tracked by a video camera or like device. Some implementations of this process have already been described in reference to FIGS. 1-7.

The process includes visually tracking an object's motion 800 from a first position to a second position. In some implementations, visually tracking an object's motion includes using a video camera or a like device. The object to be tracked can be any tangible articles, such as a human head, a pen, etc.

Responsive to tracking the object's motion, the display transitions its current focus from a first visual presentation (e.g., a first window or user interface) to a second visual presentation (e.g., a second window or user interface) corresponding to the object's motion 810. The transitioning of focus on the display can be indicated by a pointer or a graphical icon shown on the display.

In some implementations, there are one or more windows shown on the display. The pointer or the graphical icon can hover to signal transitioning of focus within a window or among multiple windows. If the pointer or the graphical icon is within one window, it can also manipulate a digital file presented by the window, by scrolling the file up, down, left and right, for example.

Example Process of Display for Visual Transition Tracking

FIG. 9 is a flow diagram of an example process for indicating focus of a display and transitioning a graphical icon's visual presentation corresponding to an object's motion. Some implementations of this process are described in reference to FIGS. 5-7.

The process includes indicating a current focus of a display by a graphical icon 900. The focus indication can be facilitated by a pointer in the center of the graphical icon, or simply by the position of the graphical icon.

The process further includes visually tracking an object's motion from a first visual state to a second visual state 910. For instance, the camera tracks a non-linear motion of a user's head, such as rotating about an axis clockwise.

Responsive to tracking the object's motion from a first visual state to a second visual state, the process transitions the graphical icon on the display from a first visual presentation to a second visual presentation corresponding to the object's motion 920. Following the previous example illustrated the preceding paragraph, the graphical icon shown on the display will rotate clockwise, corresponding to the clockwise rotating of the user's head.

In some implementations, the graphical icon indicates a changing of the focus of a display and rotates itself at the same time while the object being tracked moves both linearly and/or non-linearly. In some implementations, the graphical icon's motion is not constrained to rotating.

Example Process of Display for Multiple Objects

FIG. 10 is a flow diagram of an example process for tracking two objects' motions and transitioning focus of display corresponding to the two objects' motions. Some steps of this process have been described in reference to FIG. 8.

The process includes visually tracking an object's motion from a first position to a second position 1000. After tracking the object's motion, the process transitions focus of a display from a first visual presentation to a second presentation 1010. The process repeats itself by visually tracking a second object's motion from a third position to a fourth position 1020. Then the process transitions focus of the display from a third visual presentation to a fourth presentation 1030.

The process can be further explained by an example where two or more people are sharing and observing a single desktop. Each of them is able to transition the focus of the desktop by simply moving his or her head.

In some implementations, the two objects being visually tracked can take turns to move as well as manipulate a graphical icon shown on the display. In an example where the graphical icon is a volleyball, two people can take turns to move and spin the volleyball by simply moving their heads.

Example Process of Multiple Displays

FIG. 11 is a flow diagram of an example process for tracking an object motion and transitioning focus of display corresponding to the object motion on a second display.

The process includes visually tracking an object's motion from a first position to a second position 1100. Responsive to tracking the object's motion, the process transitions focus of a display from a first visual presentation to a second visual presentation corresponding to the object's motion 1110. The process also transitions focus of a second display from a third visual presentation to a fourth presentation corresponding to the object's motion 1120.

In some implementations, the multiple displays are connected by networks. Two or more users can, on their respective displays, observe and control focus of a single desktop, or that of a presentation of a shared digital file. By way of illustration, when two or more users chat online and discuss a file presented on their respective displays, each of them can transition focus of the presentation of the file by moving his or her head. As another example, when two or more users play games online, each of them can manipulate a graphical icon (e.g., a volleyball or a basketball), simply by moving his or her head.

System Architecture

Figure 12:
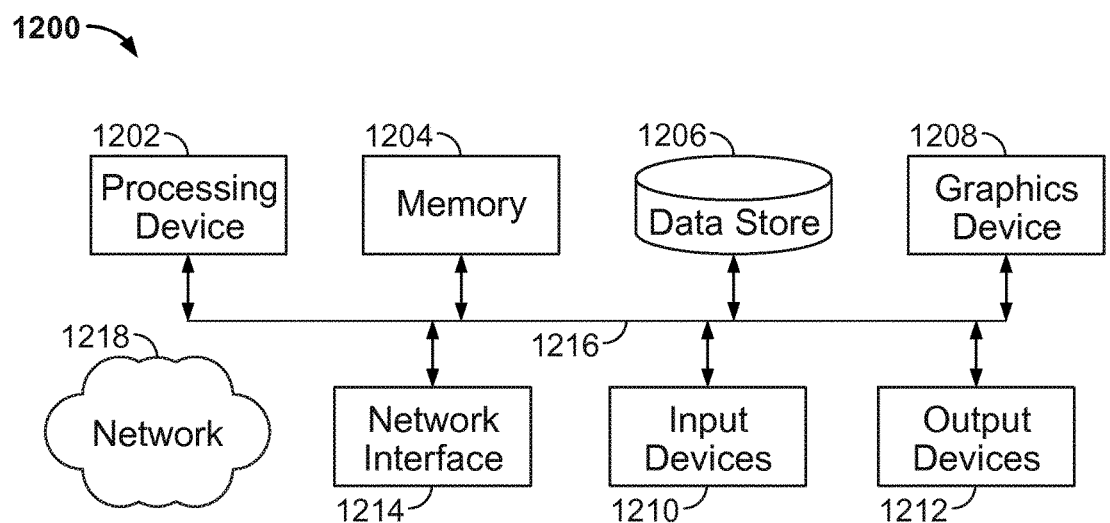
FIG. 12 is a block diagram of an example system architecture that can be utilized to implement the systems and methods described in this application.

FIG. 12 is a block diagram of an example system architecture 1200 that can be utilized to implement the systems and methods described in reference to FIGS. 1-11. The system 1200 can, for example, be implemented in a computer device, such as any one of the personal computer devices available from Apple Inc. (Cupertino, Calif., USA), or other personal computer devices. Other example implementations can also include video processing devices, multimedia processing devices, portable computing devices, etc.

The example system 1200 includes a processing device 1202, a first data store 1204, a second data store 1206, a graphics device 1208, input devices 1210, output devices 612, and a network device 614. A bus system 1216, such as a data bus and a motherboard, can be used to establish and control data communication between the components 1202, 1204, 1206, 1208, 1210, 1212 and 1214. Other example system architectures, however, can also be used.

The processing device 1202 can, for example, include one or more microprocessors having one or more processing cores. The first data store 1204 can, for example, include a random access memory storage device, such as a dynamic random access memory, or other types of computer-readable medium memory devices. The second data store 1206 can, for example, include one or more hard drives, a flash memory, and/or a read only memory, or other types of computer-readable medium memory devices.

The graphics device 1208 can, for example, include a video card, a graphics accelerator card, a graphics processing unit (GPU) or a display adapter, and is configured to generate and output images to a display device. In one implementation, the graphics device 1208 can be realized in a dedicated hardware card connected to the bus system 1216. In another implementation, the graphics device 1208 can be realized in a graphics controller integrated into a chipset of the bus system 1216.

Example input devices 1210 can include a video camera, a keyboard, a mouse, a stylus, etc., and example output devices 1212 can include a display device, an audio device, etc.

The network interface 1214 can, for example, include a wired or wireless network device operable to communicate data to and from a network 1218. The network 1218 can include one or more local area networks (LANs) or a wide area network (WAN), such as the Internet.

In an implementation, the system 1200 includes instructions defining an operating system stored in the first data store 1204 and/or the second data store 1206. Example operating systems can include the MAC OS® X series operating system, the WINDOWS® based operating system, or other operating systems. Upon execution of the operating system instructions, access to various system objects is enabled. Example system objects include data files, applications, functions, windows, etc. To facilitate an intuitive user experience, the system 1200 includes a graphical user interface that provides the user access to the various system objects and conveys information about the system 1200 to the user in an intuitive manner.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

View Changing of a Three-Dimensional Graphical Icon

Figure 13A:
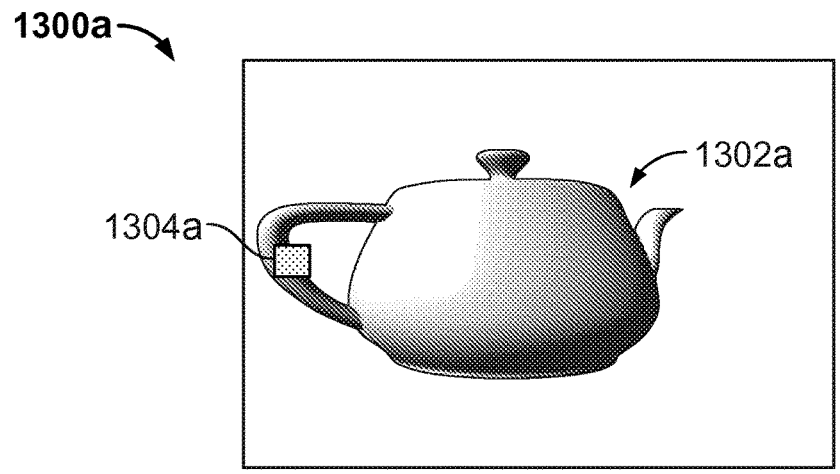
FIG. 13A-13C are screenshots showing a three-dimensional graphical icon (e.g., a teapot) being displayed from different angles depending on a user's perspectives.
Figure 13B:
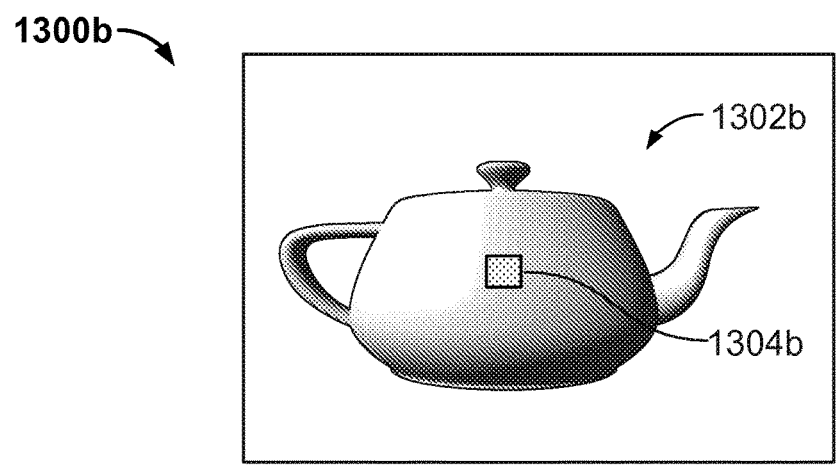
Figure 13C:
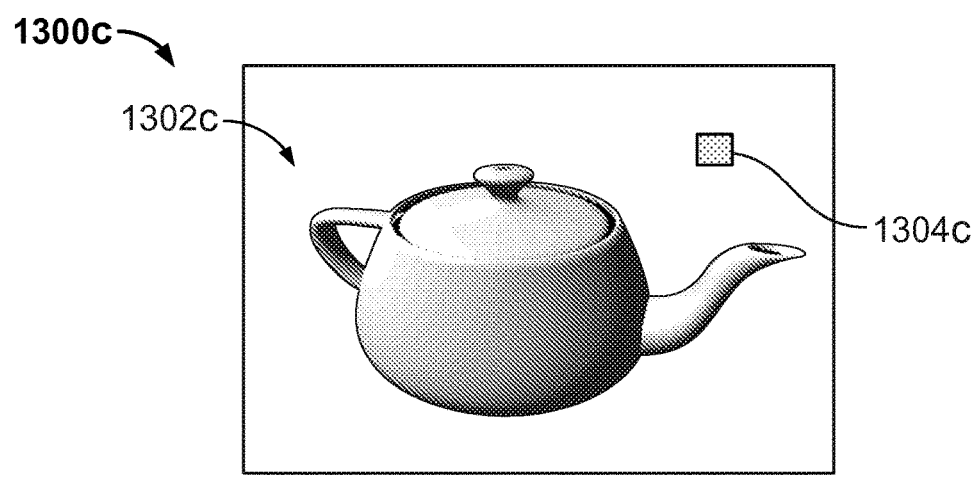

FIG. 13A-13C are screenshots showing a three-dimensional graphical icon 1302a-1302c (e.g., a teapot) being displayed from different angles depending on a user's perspectives. In the examples shown, a position of the user's head or other object, is represented by an indicator 1304a-1304c on a display 1300a-1300c. Note FIG. 13A-13C merely serve as examples to illustrate how a three-dimensional graphical icon can be viewed on a display from various angles in response to the motion of the user's head or other object. In some implementations, the indicator 1304a-1304c is not actually displayed.

In FIG. 13A, the position of the user's head, for example, is represented by the indicator 1304a. In the example shown, the user is looking at the icon 1302a from a left of the icon 1302a, after moving the user's head to the left, relative to the position of the icon 1302a shown on the display 1300a. In response to the user's head motion, the icon 1302a is presented on the display 1300a in a way as if the icon 1302a is actually viewed by the user from a left angle.

In FIG. 13B, the position of the user's head is represented by the indicator 1304b. In the example shown, the user is looking at the icon 1302b from a center front of the icon 1302b shown on the display 1300b, after moving the user's head to the center front, relative to the position of the icon 1302b. In response to the user's head motion, the icon 1302b is presented on the display 1300b in a way as if the icon 1302b is actually viewed by the user from a center front angle.

In FIG. 13C, the position of the user's head is represented by the indicator 1304c. In the example shown, the user is looking at the icon 1302c from a top right of the icon 1302c, after moving the user's head to the top right, relative to the position of the icon 1302c shown on the display 1300c. In response to the user's head motion, the icon 1302c is presented on the display 1300c in a way as if the icon 1302c is actually viewed by the user from a top right angle.

In some implementations, the three-dimensional graphical icon 1302a-1302c is presented to appear closer or farer to the user depending on a distance from the user to the icon 1302a-1302c shown on the display 1300a-1300c. In various implementations, the appearance of the icon 1302a-1302c shown on the display 1300a-1300c is adjusted according to both the distance and the angle of the user.

The technology of displaying the three-dimensional graphical icon 1302a-1302c from different angles and/or in various distances, corresponding to the motion of the user's head or other object, can be broadly employed in computer graphics, including two-dimensional graphics, three-dimensional graphics, and image processing. By way of illustration, in the field of three-dimensional modeling (a process of developing a representation of a three-dimensional object via specialized software), the user can easily see the object being modeled on the display from different angles and/or in various distances by moving the user's head or other object.

Changing of Views in a Three-Dimensional Universe

Figure 14A:
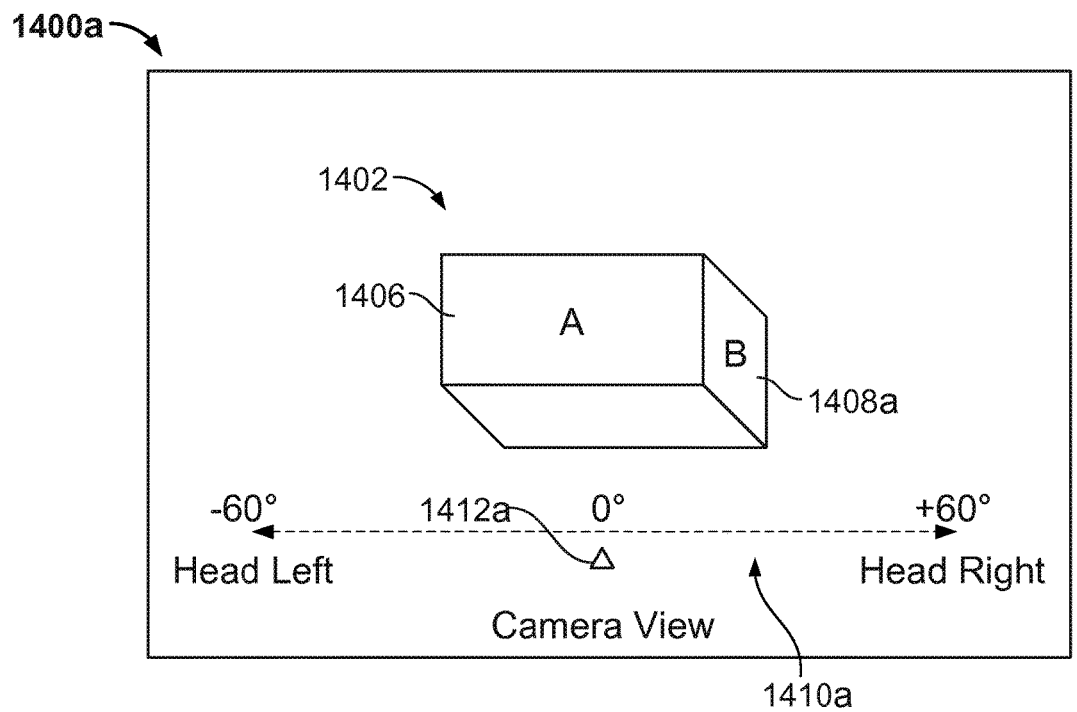
FIG. 14A-14B illustrates changing of views from a user's perspective in a three-dimensional space.
Figure 14B:
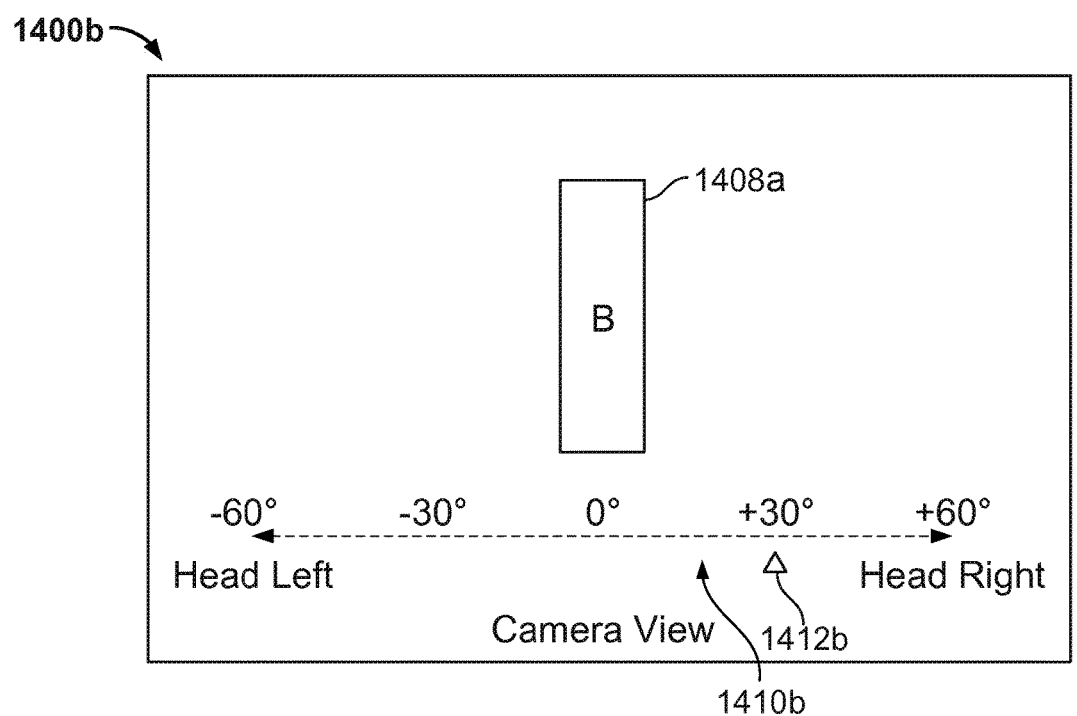

FIG. 14A-14B illustrates changing of views from a user's perspective in a three-dimensional space 1402. In FIG. 14A, a box-shaped space shown on a display 1400a represents a three-dimensional space 1402. A display 1400a-1400b correspondingly presents different aspects of the three-dimensional space 1402 in response to user's head motion.

For purposes of illustration, an axis 1410a-1410b in FIG. 14A-14B represents a motion path of the user's head. For example, when the user's head turns right by 60° from a initial point 0°, an index 1412a-1412b correspondingly points at 60° on the right end of the axis 1410a-1410b. In various implementations, the axis 1410a-1410b and/or the index 1412a-1412b is not actually displayed.

In FIG. 14A, the user initially looks to the front facing the display 1400a, as the index 1412a indicates. Correspondingly, a side A 1406 of the space 1402 is presented on the display to the user, to simulate what the user sees as if the user is actually situated in the space 1402.

Following the example illustrated in FIG. 14A, the user in FIG. 14B turn his head to the right by 30°, as the index 1412b indicates on the axis 1410b. Imagine the user is situated in the three-dimensional space 1402. After the user turns his head to the right by 30°, the user is supposed to face a side B 1408b of the space 1402. To simulate the user's view as a result of the head motion, the display 1400b correspondingly presents the side B 1408b of the space 1402 to the user.

In some implementations, the aspects of the three-dimensional space 1402 look closer or farer depending on the user's distance to the aspects shown on the display 1400a-1400b. In various implementations, the appearance of the aspects of the space 1402 is adjusted according to both the angle and the distance of the user.

The technology of showing different aspects of the three-dimensional space 1402, in response to the motion of the user's head or other object, can be broadly employed in video games implemented on various platforms. By way of illustration, in a three-dimensional computer game that correspondingly presents aspects of a three-dimensional universe reflecting the user's viewpoints, the user can conveniently change views by motion of the user's head or other object.

Figure 15:
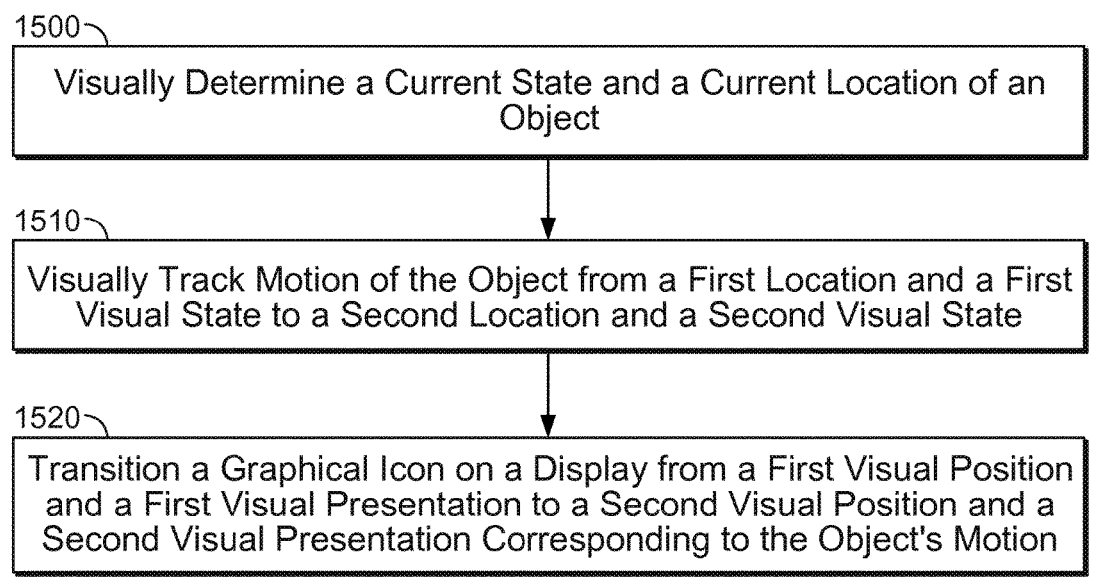
FIG. 15 is a flow diagram of an example process for transitioning a graphical icon's visual presentation concurrently with its visual location corresponding to an object's motion.

Example Process of Display for Tracking of Visual Change in States and Locations FIG. 15 is a flow diagram of an example process for transitioning a graphical icon's visual presentation concurrently with its visual location corresponding to an object's motion. Some implementations of the process are described in reference to FIG. 7-9.

The process includes visually determining a current state and a current location of an object 1500. In some implementations, visually determining the object's current state and location involves using a video camera or a like device.

After determining the object's current state and location, the process visually tracks motion of the object from a first location (e.g., the object on the left of the display) and a first visual state (e.g., the object facing the display) to a second location (e.g., the object on the right of the display) and a second visual state (e.g., the object turning to the right by 30°) 1510. Responsive to tracking the object's motion, the display transitions a graphical icon on a display from a first visual position (e.g., a first window or user interface) and a first visual presentation (e.g., the graphical icon facing front) to a second visual position (e.g., a second window or user interface) and a second visual presentation (e.g., the graphical icon turning to the right by 30°) corresponding to the object's motion 1520.

What is claimed is:

1. A method comprising:
tracking motion of a region of a target within a space from a first position of the region within the space to a second position of the region within the space; and
moving, corresponding to the tracking, in any of six degrees of freedom, a visual presentation of graphical content within a three-dimensional display environment represented on a display from a first visual presentation of the graphical content to a second visual presentation of the graphical content, wherein:
a portion of the graphical content in the first visual presentation of the graphical content is in a first plane of the three-dimensional display environment; and
the portion of the graphical content in the second visual presentation of the graphical icon is in a second plane of the three-dimensional display environment that is different than the first plane of the three-dimensional display environment.

2. The method of claim 1, wherein at least a portion of the moving is carried out during the tracking.

3. The method of claim 1, wherein the tracking comprises visually tracking the motion of the region of the target within the space from the first position within the space to the second position within the space.

4. The method of claim 3, further comprising using a camera to visually track the motion of the region of the target within the space from the first position within the space to the second position within the space.

5. A method comprising:
tracking motion of a region of a target within a space from a first position of the region within the space to a second position of the region within the space;

moving, corresponding to the tracking, in any of six degrees of freedom, a visual presentation of graphical content within a three-dimensional display environment represented on a display from a first visual presentation of the graphical content to a second visual presentation of the graphical content; and prior to the tracking, receiving a selection of a target zone of an image of the target to be tracked, wherein the target zone of the image comprises an image of the region of the target to be tracked, and wherein the tracking comprises tracking the motion of the region of the target from the first position within the space to the second position within the space based on the received selection.

6. The method of claim 1, wherein the moving comprises rotating the graphical content within the three-dimensional display environment represented on the display.

7. A method comprising:

following movement of a target within a space;

determining an appropriate action according to a path of the followed movement; and adjusting, in any of six degrees of freedom, according to the determining, a visual presentation of graphical content within a three-dimensional display environment represented on a display from a first visual presentation of the graphical icon to a second visual presentation of the graphical icon, wherein:

a portion of the graphical content in the first visual presentation of the graphical content is in a first plane of the three-dimensional display environment; and the portion of the graphical content in the second visual presentation of the graphical content is in a second plane of the three-dimensional display environment that is different than the first plane of the three-dimensional display environment.

8. A method comprising:

while displaying graphical content on a display as a first visual presentation of the graphical content, detecting motion of a target from a first situation within a space outside the display to a second situation within the space; and based on the detecting, changing, in any of six degrees of freedom within a three-dimensional display environment represented on the display, the graphical content displayed on the display from the first visual presentation of the graphical content to a second visual presentation of the graphical content, wherein:

the focus of the first visual presentation is a first portion of the graphical content that is in a first plane of the three-dimensional display environment when the graphical content is displayed on the display as the first visual presentation of the graphical content;

the focus of the second visual presentation is a second portion of the graphical content that is in the first plane of the three-dimensional display environment when the graphical content is displayed on the display as the second visual presentation of the graphical content; and the first portion of the graphical content and the second portion of the graphical content are always in different planes of the three-dimensional display environment.

9. The method of claim 8, wherein the first and second portions of the graphical content are different user interfaces.

10. The method of claim 8, wherein the first and second portions of the graphical content are different windows.

11. The method of claim 8, wherein:

the first portion of the graphical content is displayed in the first plane of the three-dimensional display environment when the graphical content is displayed on the display as the first visual presentation of the graphical content; and the second portion of the graphical content is displayed in a second plane of the three-dimensional display environment when the graphical content is displayed on the display as the first visual presentation of the graphical content; and the first plane is parallel to the second plane.

12. The method of claim 11, wherein the space is closer to the first plane than to the second plane.

13. The method of claim 11, wherein:

the second portion of the graphical content is displayed in the first plane of the three-dimensional display environment when the graphical content is displayed on the display as the second visual presentation of the graphical content; and the first portion of the graphical content is displayed in a third plane of the three-dimensional display environment when the graphical content is displayed on the display as the second visual presentation of the Graphical content; and the first plane is parallel to the third plane.

14. The method of claim 13, wherein the second plane is parallel to the third plane.

15. The method of claim 13, wherein the second plane is the third plane.

16. The method of claim 13, wherein the space is closer to the first plane than to the second plane.

17. The method of claim 13, wherein the space is closer to the first plane than to the third plane.

* * * * *